United States Patent [19]
Scott

[11] Patent Number: 4,600,422
[45] Date of Patent: Jul. 15, 1986

[54] METHOD FOR MAKING AND COATING OPTICAL FIBRES

[75] Inventor: Michael G. Scott, Safron Walden, United Kingdom

[73] Assignee: Standard Telephone & Cables, London, England

[21] Appl. No.: 715,958

[22] Filed: Mar. 25, 1985

[30] Foreign Application Priority Data

Mar. 27, 1984 [GB] United Kingdom ............... 8407864

[51] Int. Cl.⁴ ............... C03B 37/027; C03C 25/04
[52] U.S. Cl. ............... 65/3.3; 65/3.12; 65/32
[58] Field of Search ............ 65/2, 3.3, 32, 3.12

[56] References Cited

U.S. PATENT DOCUMENTS

| 2,938,821 | 5/1980 | Nack | 65/3.3 |
| 3,046,170 | 7/1962 | Toulmin | 65/3.3 X |
| 4,321,073 | 3/1982 | Blair . | |
| 4,381,141 | 4/1983 | Sakuragi et al. | 65/3.3 X |
| 4,418,984 | 12/1983 | Wysocki et al. | 65/3.3 X |

FOREIGN PATENT DOCUMENTS

| 0095729 | 7/1983 | European Pat. Off. . |
| 0078749 | 11/1983 | European Pat. Off. . |
| 821055 | 3/1956 | United Kingdom . |
| 1558550 | 1/1980 | United Kingdom . |
| 2105371 | 3/1983 | United Kingdom . |
| 0903327 | 2/1982 | U.S.S.R. ............... 65/3.3 |

OTHER PUBLICATIONS

PCT WO80/00157 Schladitz, Feb. 7, 1980.

Primary Examiner—Robert Lindsay

[57] ABSTRACT

Infrared optical fibres are provided with hermetic coatings (6) by decomposition or reaction of volatile compounds of the coating material at the surface of the fibre. Materials having melting points greater than the fibre's glass transition temperatures may thus be applied at temperatures lower than the glass transition temperatures. The fibre (1) may be sufficiently hot from a preceding fibre formation (2,3) process in line with the coating process to enable the decomposition or reaction, or additional heating of the fibre by radiation may be necessary in the reaction chamber (7).

8 Claims, 2 Drawing Figures

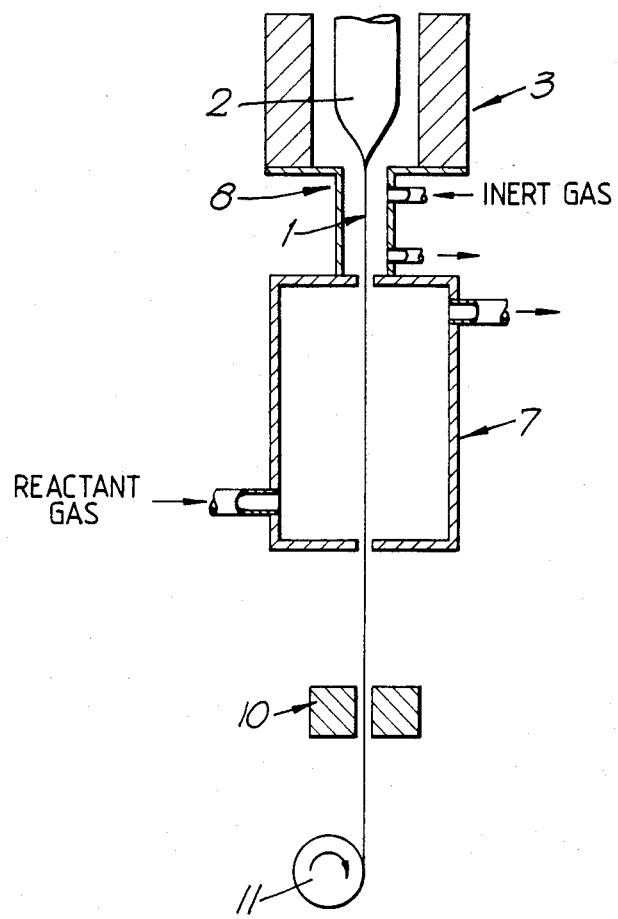
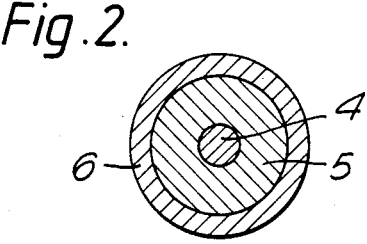

METHOD FOR MAKING AND COATING OPTICAL FIBRES

BACKGROUND OF THE INVENTION

This invention relates to optical fibres and in particular infrared optical fibres and coating methods therefor.

The current high level of interest in mid-infrared transmitting fibres arises primarily from their potential as ultra low attenuation communicating fibres. Among the materials already identified for such use are glasses based on halides and chalcongenides. However, the penalty of attaining increased infrared transmission over that of silicates is a significant reduction in thermal, mechanical and chemical stability. For example, fluorozirconate glasses, which are amongst the prime candidates at present, crystallise spontaneously near 400° C., have low tensile strengths, and in fibre form are rapidly attacked by liquid water and moist air.

To realise the potential of these glasses it will be necessary to include a primary coating which hermetically seals the fibre from ingress of moisture. Metals are particularly attractive from this point of view, and since their expansion coefficients are similar to those of fluoride glasses, minimal contraction stresses are likely to be set up. However, the low thermal stability of these glasses prevents application of most metals from the melt, and other processes such as vapour deposition or sputtering require vacuum or reduced pressure and are incompatible with on-line fibre processings.

SUMMARY OF THE INVENTION

According to the present invention there is provided a method of coating an infrared optical fibre with a material having a melting point greater than the glass transition temperature of the fibre material, including the step of causing, at the surface of the fibre, the decomposition or reaction of a volatile compound of the material to be applied to the fibre, whereby to provide an hermetic coating of the material on the surface of the fibre, which decomposition or reaction takes place at a temperature lower than the glass transition temperature and which coating process is performed in-line with the fibre fabrication process.

BRIEF DESCRIPTION OF THE DRAWINGS

Embodiments of the invention will now be described with reference to the accompanying drawings, in which:

FIG. 1 illustrates, schematically, an arrangement of apparatus for drawing and coating infrared optical fibres, and FIG. 2 illustrates a cross-section through a coated infrared optical fibre.

DESCRIPTION OF THE PREFERRED EMBODIMENT

As mentioned hereinbefore, a primary coating which hermetically seals the fibre is required for infrared fibres. Metals are particularly attractive for this but there are problems involved with the known methods of application.

There are, however, a large number of volatile organo-metallic compounds that can be decomposed at relatively low temperatures to produce the elemental metal. Thus if the vapour, below its decomposition temperature, is passed over a substrate, heated to an appropriate temperature, decomposition or reaction will occur only at the substrate surface thus providing a coating thereon.

Referring now to the drawings the principles of the process for coating an infrared optical fibre will be described. A fibre 1 of infrared transmitting material is produced in a conventional manner either from molten material in a crucible or, and as illustrated, by softening the tip of a preform 2 in a fibre pulling furnace 3. To avoid absorption losses from the coating to be applied the fibre may have a glass core/cladding structure. The coated fibre cross-section shown in FIG. 2 comprises an infrared transmitting glass core 4, infrared transmitting glass cladding 5 with an hermetic metal coating 6. Following drawing, the fibre is at all times protected by an environment of inert or reactive gas to exclude atmospheric moisture. The hermetic metal coating 6 is applied by passing the fibre through a reaction chamber 7 in which is maintained a flow of reactant gases. Between the fibre pulling furnace 3 and the reaction chamber 7 the fibre passes through a chamber 8 in which is maintained a flow of inert gas. The flow of reactant gases may be generated either by volatisation of the appropriate liquid or by bubbling an inert carrier gas, such as argon, through the liquid. If the fibre is maintained at a sufficiently high temperature the gases will react only at the fibre surface and thereby produce a good quality hermetic metallic coating. The heat retained in the fibre from the pulling furnace may, in some cases, be sufficient. Alternatively it will be necessary to heat the fibre by radiation in such a manner that neither the reactants or the chamber walls are heated significantly. The metal coated fibre 9 emerging from the reaction chamber 7 may be secondary coated with a polymer by means indicated generally at 10 prior to being wound onto a storage drum or spool 11.

The method described above thus provides the ability to coat hermetically low temperature fibres (infrared fibres) with high temperature metals, such as nickel, this being achieved at a temperature lower than the melting point of the metal and the temperature at which the fibres become unstable, the glass transition temperature.

The requirements for the reactants are that they must have relatively high vapour pressure near room temperature so that they can be volatised easily, and must react or decompose to elemental metal at a temperature below the glass transition temperature of the fibre material. In principle many metals can be deposited in this way, the following being examples, only, of metals and source materials, namely:

cobalt—by the decomposition of cobalt acetyl acetone at 150° C.

nickel—by the decomposition of nickel carbonyl at 200° C.

aluminium—by the decomposition of tri-isobutyl aluminium at 200° C.

I claim:

1. A method of manufacturing a metallic coated infrared optical fibre, the metal having a melting point greater than the glass transition temperature of the fibre material, the fibre including a core of infrared transmitting glass and a cladding of infrared transmitting glass, including the steps of fabricating the core/cladding structure of the fibre by a method including the application of heat and drawing, and in-line with the fibre fabrication causing, at the surface of the fibre whilst it is still hot from the fabrication thereof, the decomposition or reaction of a volatile compound of the metal, whereby to provide a hermetic coating on the surface of the fibre, which decomposition or reaction takes place at a temperature lower than the glass transition temperature.

2. A method as claimed in claim 1 wherein the infrared fibre is fabricated by drawing from a preform and including the step of maintaining the freshly drawn fibre in an inert atmosphere prior to the decomposition or reaction step.

3. A method as claimed in claim 1, wherein the heat retained in the fibre following the fabrication process is sufficient to cause said decomposition or reaction.

4. A method as claimed in claim 1, further including the step of providing the fibre with additional heat by radiation whereby to raise it to a temperature sufficient to cause said decomposition or reaction.

5. A method as claimed in claim 1, including the step of coating the fibre provided with the hermetic coating with a polymeric coating.

6. A method as claimed in claim 1, wherein the hermetic coating is of cobalt and provided by the decomposition of cobalt acetyl acetonate.

7. A method as claimed in claim 1, wherein the hermetic coating is of nickel and provided by the decomposition of nickel carbonyl.

8. A method as claimed in claim 1, wherein the hermetic coating is of aluminium and provided by the decomposition of tri-isobutyl aluminium.

* * * * *